(12) United States Patent (10) Patent No.: US 8,340,031 B2
Arnott (45) Date of Patent: Dec. 25, 2012

(54) RESOURCE ALLOCATION

(75) Inventor: Robert Arnott, Tokyo (JP)

(73) Assignee: NEC Corporation, Tokyo (JP)

( * ) Notice: Subject to any disclaimer, the term of this patent is extended or adjusted under 35 U.S.C. 154(b) by 242 days.

(21) Appl. No.: 12/452,985

(22) PCT Filed: Aug. 4, 2008

(86) PCT No.: PCT/JP2008/064374
§ 371 (c)(1),
(2), (4) Date: Feb. 1, 2010

(87) PCT Pub. No.: WO2009/017260
PCT Pub. Date: Feb. 5, 2009

(65) Prior Publication Data
US 2010/0135222 A1     Jun. 3, 2010

(30) Foreign Application Priority Data

Aug. 2, 2007 (GB) .................................. 0715057.6

(51) Int. Cl.
*H04W 4/00* (2009.01)
(52) U.S. Cl. ........ 370/329; 370/331; 370/336; 375/260; 375/267
(58) Field of Classification Search .................. 370/329, 370/328, 341, 395.41; 455/450, 464, 509
See application file for complete search history.

(56) References Cited

U.S. PATENT DOCUMENTS

| | | |
|---|---|---|
| 2005/0135324 A1 | 6/2005 | Kim |
| 2007/0009054 A1 | 1/2007 | Kwak et al. |
| 2007/0248046 A1 | 10/2007 | Khan |
| 2008/0186919 A1* | 8/2008 | Huang et al. .................. 370/331 |
| 2009/0060081 A1* | 3/2009 | Zhang et al. .................. 375/267 |

(Continued)

FOREIGN PATENT DOCUMENTS

GB     2 436 416 A     9/2007

(Continued)

OTHER PUBLICATIONS

NEC Group: "DL Distributed Resource Signalling for EUTRA", 3GPP Draft; R1-072826, 3rd Generation Partnership Project (3GPP), Mobile Competence Centre; 650, Route Des Lucioles; F-07921 Sophia-Antipolis Cedex; France, vol. tsg_ran\WG1_RL1\TSGR1_49b\Docs, no. Orlando, USA; Jun. 25, 2007, Jun. 19, 2007, XP050106507 the whole document.

(Continued)

*Primary Examiner* — Ricky Ngo
*Assistant Examiner* — Richard K Chang
(74) *Attorney, Agent, or Firm* — McGinn IP Law Group, PLLC (57) ABSTRACT

A number of techniques are described for signalling the allocation of resources within a communications system. A preferred method that is described includes the steps of: receiving an allocation of sub-carriers for a user device, the allocation comprising data defining a starting block and data defining a number of consecutive blocks from the starting block; a first mapping step of mapping the data defining the number of consecutive blocks from the starting block to a first mapped value in accordance with first mapping data; a second mapping step of mapping the data defining the starting block and said first mapped value to a second mapped value representative of the allocation in accordance with second mapping data; and signalling said second mapped value as resource allocation data to the user device.

33 Claims, 4 Drawing Sheets

FOREIGN PATENT DOCUMENTS

WO  WO 2006/137708 A1   12/2006
WO  WO 2007/107821 A2   9/2007

OTHER PUBLICATIONS

NEC Group, et al.: "Uplink Resource Allocation for E-UTRA" 3GPP Draft; R1-063205, 3rd Generation Partnership Project (3GPP), Mobile Competence Centre; 650, Route Des Lucioles; F-06921 Sophia-Antipolis Cedex; France, vol. tsg_ran\WG1_RL1\TSGR1_47\Docs, no. Riga, Latvia, Nov. 6, 2006, Oct. 31, 2006, XP050103660 the whole document.

* cited by examiner

RESOURCE ALLOCATION

TECHNICAL FIELD

The present invention relates to the signalling of resource allocations within a communication system. The invention has particular, although not exclusive relevance to the signalling of sub-carriers used in an orthogonal frequency divisional multiple access (OFDMA) communication system.

BACKGROUND ART

OFDMA and single carrier FDMA have been selected as the downlink and uplink multiple access schemes for the E-UTRA air interface currently been studied in 3GPP (which is a standard based collaboration looking at the future evolution of third generation mobile telecommunication systems). Under the E-UTRA system, a base station which communicates with a number of user devices allocates the total amount of time/frequency resource (depending on bandwidth) among as many simultaneous users as possible, in order to enable efficient and fast link adaptation and to attain maximum multi-user diversity gain. The resource allocated to each user device is based on the instantaneous channel conditions between the user device and the base station and is informed through a control channel monitored by the user device.

In order to support a large number of user devices, an efficient mechanism of resource signalling utilizing the least possible time/frequency resource is necessary.

DISCLOSURE OF INVENTION

According to one aspect, the present invention provides a method of determining allocation data for use in a communication system which uses a plurality of sub-carriers arranged in a sequence of blocks, the method comprising: receiving an allocation of said sub-carriers for a user device, the allocation comprising data defining a starting block and data defining a number of consecutive blocks from the starting block; a first mapping step of mapping the data defining the number of consecutive blocks from the starting block to a first mapped value in accordance with first mapping data; a second mapping step of mapping the data defining the starting block and said first mapped value to a second mapped value representative of the allocation in accordance with second mapping data. The allocation data may then be signalled to a user device for controlling the sub-carriers it uses for its communications.

The number of possible consecutive blocks that can be allocated may be chosen from a subset of all the possible numbers of consecutive blocks that can be allocated. For example, the number of possible consecutive blocks that can be allocated may be chosen from the subset defined by:

$$P = 2^i \cdot 3^j \cdot 5^k$$

where i, j and k are integer values $\geq 0$; and P is less than or equal to the total number, N, of blocks in said sequence of blocks.

The first mapping data may define a mapping such that the first mapped value is less than or equal to the number of consecutive blocks allocated to the user device. The mapping is preferably a one to one mapping between said allocated number of consecutive blocks and said first mapped value. In one embodiment, the first mapping data defines a lookup table which is addressed by the data defining the number of consecutive blocks.

The second mapping data may also define a look up table, but preferably defines one or more equations. The equation preferably multiplies one of the starting block number or the first mapped value by a constant and adds the result to the other one of the starting block number and the first mapped value. In one embodiment the second mapping data defines the following expression:

$$x = M * \text{index}P + O$$

where x is the second mapped value; M is a system constant which depends upon the system bandwidth, the number of sub-carriers within each block and the frequency spacing between adjacent sub-carriers; indexP is the first mapped value; and O is the number of the starting block.

In another embodiment, the second mapping defines the following expression:

$$x = L * O + \text{index}P$$

where x is the second mapped value; L is a system constant which depends upon the system bandwidth, the number of sub-carriers within each block and the frequency spacing between adjacent sub-carriers; indexP is the first mapped value; and O is the number of the starting block.

The signalling step may signal the allocation data in a common or dedicated signalling channel.

The present invention also provides a method of determining resource allocation in a communication system which uses a plurality of sub-carriers arranged in a sequence of blocks, the method comprising: receiving resource allocation data encoding a starting block and a number of consecutive blocks from the starting block; a first mapping step of mapping the received allocation data to the starting block within said sequence using first mapping data; a second mapping step of mapping the received allocation data to a value encoding the number of consecutive blocks from the starting block using second mapping data; a third mapping step of mapping said value encoding the number of consecutive blocks to the number of consecutive blocks from the starting block using third mapping data; and determining the allocated sub-carriers using the starting block and the number of consecutive blocks from the starting block.

In one embodiment, the third mapping data defines a one to one mapping such that the number of consecutive blocks is greater than the value encoding the number. The third mapping data may define a lookup table which is addressed by the value encoding the number of consecutive blocks.

In one embodiment, the first mapping data defines a look up table, but in a preferred embodiment, it defines one or more equations. For example, the first mapping step may determine the starting block, O, from the received allocation data from the following equation:

$$O = x - \text{floor}\left(\frac{x}{M}\right) \cdot M$$

where x is the received resource allocation data; M is a system constant that depends on the system bandwidth, the number of sub-carriers within each block and the frequency spacing between adjacent sub-carriers; and floor( ) is the floor function. Alternatively, the first mapping step may determine the starting block, O, from:

$$O = \text{floor}\left(\frac{x}{L}\right)$$

where x is the received resource allocation data; L is a system constant that depends on the system bandwidth, the number of sub-carriers within each block and the frequency spacing between adjacent sub-carriers; and floor( ) is the floor function.

Similarly, the second mapping data may define a look up table, but preferably defines one or more equations. For example, the second mapping step may determine the value, indexP, encoding the number of consecutive blocks from the received allocation data from the following equation:

$$indexP = \text{floor}\left(\frac{x}{M}\right)$$

where x is the received resource allocation data; M is a system constant that depends on the system bandwidth, the number of sub-carriers within each block and the frequency spacing between adjacent sub-carriers; and floor( ) is the floor function. Alternatively, the second mapping step may determine the value, indexP, encoding the number of consecutive blocks from:

$$indexP = x - \text{floor}\left(\frac{x}{L}\right) \cdot L$$

where x is the received resource allocation data; L is a system constant that depends on the system bandwidth, the number of sub-carriers within each block and the frequency spacing between adjacent sub-carriers; and floor( ) is the floor function.

The allocation data may be received over a dedicated or a common signalling channel.

The present invention also provides a method of signalling resource allocation data in a communication system which uses a plurality of sub-carriers arranged in a sequence of blocks, the method comprising: receiving an allocation of said sub-carriers for a user device, the allocation comprising data defining a starting block and data defining a number of consecutive blocks from the starting block; mapping the data defining the number of consecutive blocks from the starting block to a mapped value in accordance with predefined mapping data; and signalling resource allocation data to the user device in dependence upon said data defining said starting block and said mapped value.

The invention also provides a method of determining resource allocation in a communication system which uses a plurality of sub-carriers arranged in a sequence of blocks, the method comprising: receiving resource allocation data defining a starting block and a value related to a number of consecutive blocks from the starting block, through a predefined mapping; mapping the value to said number of consecutive blocks using predefined mapping data; and determining the allocated sub-carriers using the starting block and said number of consecutive blocks.

The invention provides, for all methods disclosed, corresponding computer programs or computer program products for execution on corresponding equipment, the equipment itself (user equipment, nodes or components thereof) and methods of updating the equipment.

These and various other aspects of the invention will become apparent, from the following detailed description of embodiments which are given by way of example only and which are described with reference to the accompanying Figures in which:

BEST MODE FOR CARRYING OUT THE INVENTION

Overview

Figure 1:
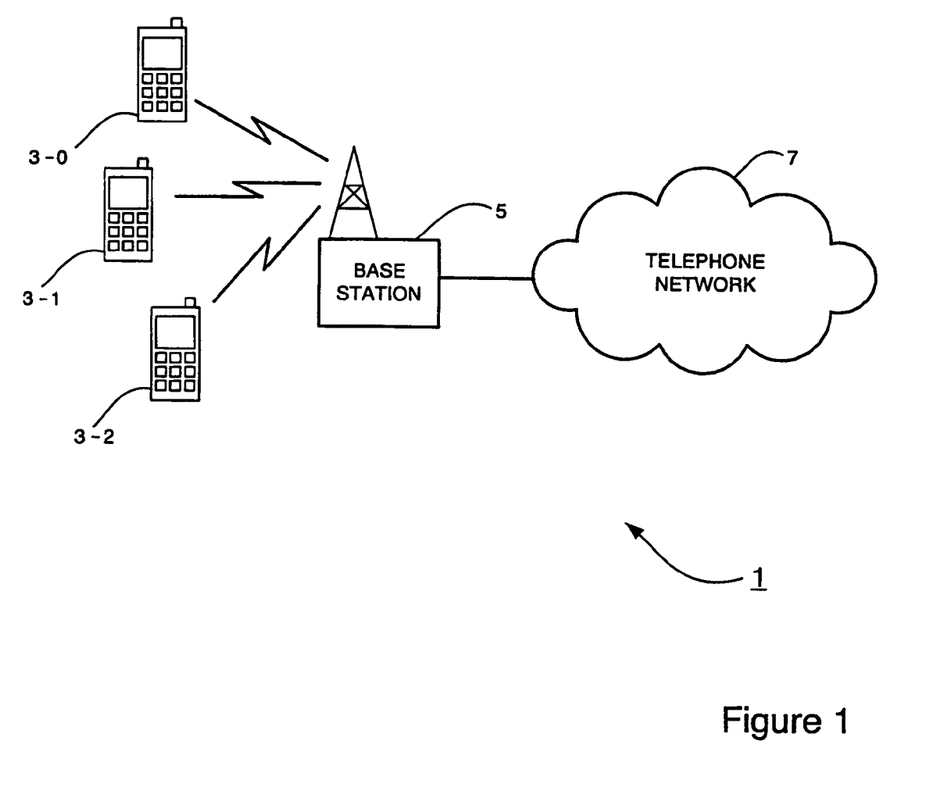
FIG. 1 schematically illustrates a communication system comprising a number of user mobile (cellular) telephones which communicate with a base station connected to the telephone network.

FIG. 1 schematically illustrates a mobile (cellular) telecommunication system 1 in which users of mobile telephones 3-0, 3-1, and 3-2 can communicate with other users (not shown) via a base station 5 and a telephone network 7. In this embodiment, the base station 5 uses an orthogonal frequency division multiple access (OFDMA) technique in which the data to be transmitted to the mobile telephones 3 is modulated onto a plurality of sub-carriers. Different sub-carriers are allocated to each mobile telephone 3 depending on the amount of data to be sent to the mobile telephone 3. In this embodiment the base station 5 also allocates the sub-carriers used to carry the data to the respective mobile telephones 3 in order to try to maintain a uniform distribution of the mobile telephones 3 operating across the base station's bandwidth. To achieve these goals, the base station 5 dynamically allocates sub-carriers for each mobile telephone 3 and signals the allocations for each time point (sub-frame) to each of the scheduled mobile telephones 3.

In this embodiment, the base station 5 has a supported bandwidth of 20 MHz of which 18 MHz is used for data transmission.

In order that each of the mobile telephones 3 can be informed about the scheduling decision, each mobile telephone 3 uses a shared control channel. The information signalled within this control channel will include:

i) resource block allocation information (for both downlink communications and uplink communications);
ii) resource block demodulation information for the downlink;
iii) resource block demodulation information for the uplink; and
iv) timing control bits.

Since the number of bits available in the control channel is limited, efficient methods are needed to transport the required information with the lowest number of bits. The invention relates to the way in which the resource allocation information can be signalled in an efficient manner to each of the mobile telephones 3.

Base Station

Figure 2:
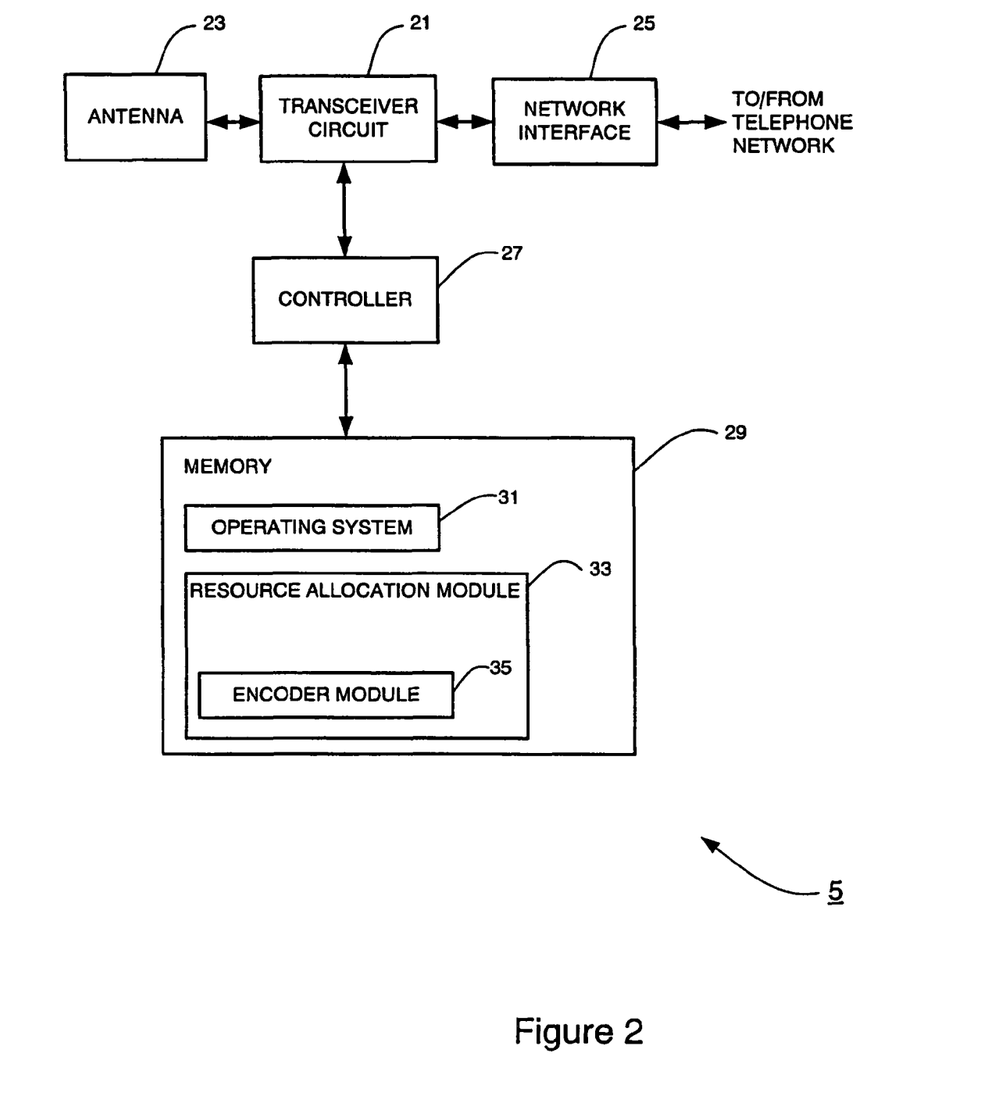
FIG. 2 is a block diagram illustrating the main components of the base station shown in FIG. 1.

FIG. 2 is a block diagram illustrating the main components of the base station 5 used in this embodiment. As shown, the base station 5 includes a transceiver circuit 21 which is operable to transmit signals to and to receive signals from the mobile telephones 3 via one or more antennae 23 (using the above described sub-carriers) and which is operable to transmit signals to and to receive signals from the telephone network 7 via a network interface 25. The operation of the transceiver circuit 21 is controlled by a controller 27 in accordance with software stored in memory 29. The software includes, among other things, an operating system 31 and a resource allocation module 33. The resource allocation module 33 is operable for allocating the sub-carriers used by the transceiver circuit 21 in its communications with the mobile telephones 3. As shown in FIG. 2, the resource allocation module 33 also includes an encoder module 35 which encodes the allocation into an efficient representation which is then communicated to the respective mobile telephones 3.

Mobile Telephone

Figure 3:
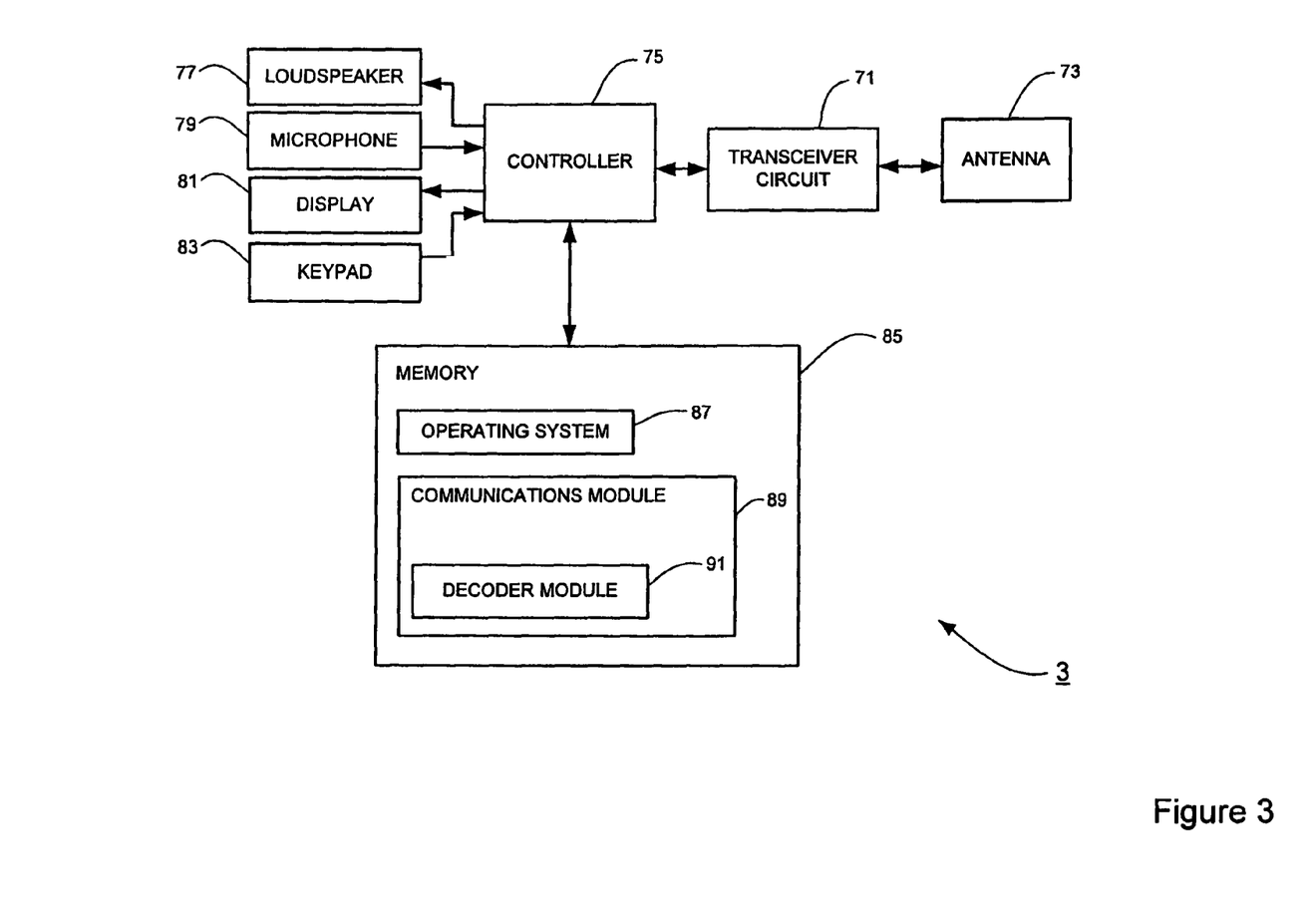
FIG. 3 is a block diagram illustrating the main components of one of the mobile telephones shown in FIG. 1.

FIG. 3 schematically illustrates the main components of each of the mobile telephones 3 shown in FIG. 1. As shown, the mobile telephones 3 include a transceiver circuit 71 which is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a communications module 89. In this embodiment, the communications module 89 includes a decoder module 91 which is operable to decode the resource allocation data signalled from the base station 5 to determine the mobile telephone's sub-carrier allocation for the current time point.

In the above description, the base station 5 and the mobile telephones 3 are described for ease of understanding as having a number of discrete modules (such as the resource allocation, encoder module, communications module and decoder module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Uplink Resource Allocation

Figure 4:
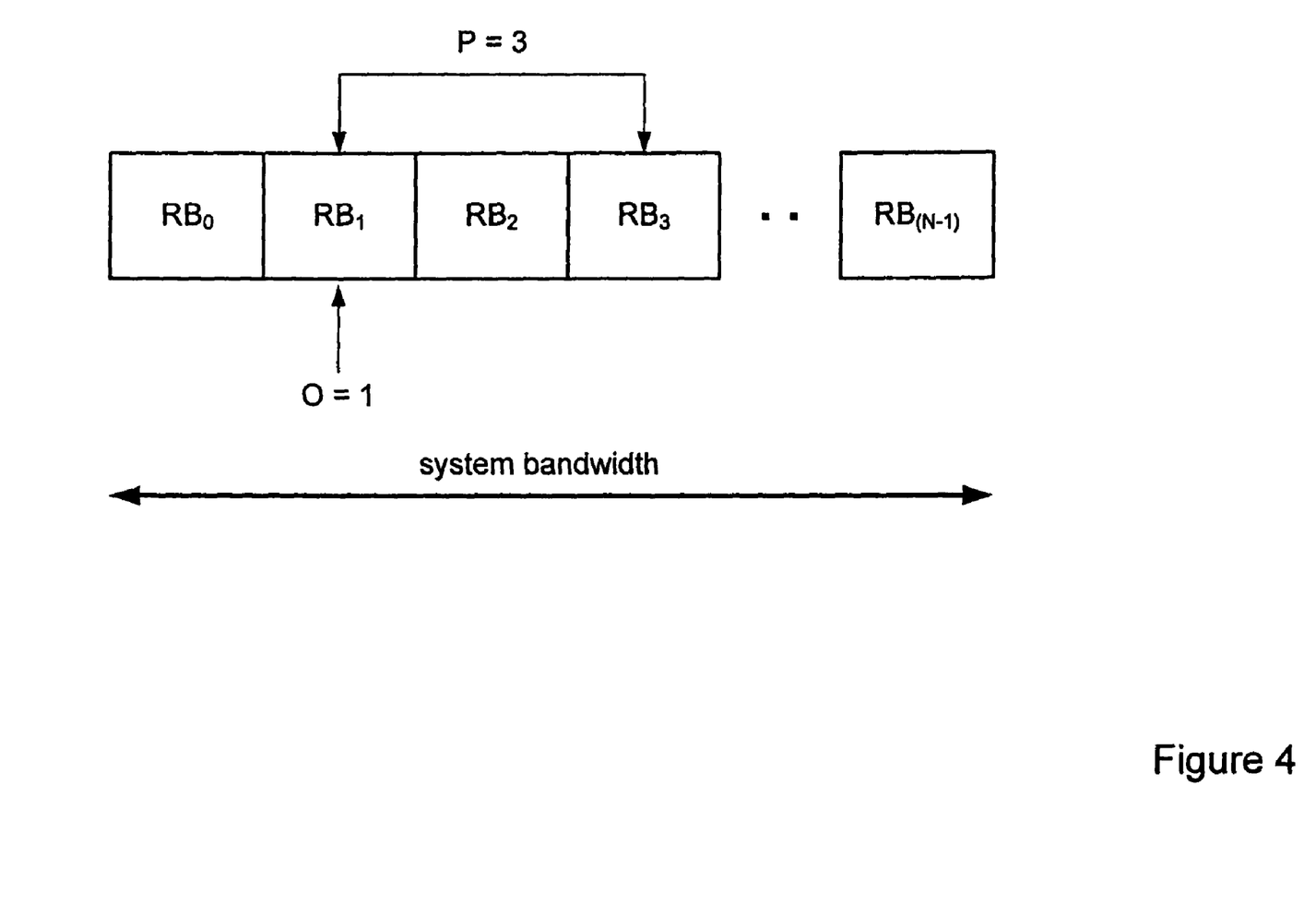
FIG. 4 illustrates the way in which a contiguous sequence of resource blocks can be identified by a starting block and a number of consecutive blocks from the starting block.

The present invention is concerned in particular with the allocation of resources for uplink communications from the mobile telephones 3 to the base station 5. According to the current E-UTRA proposal, the uplink sub-carriers have a frequency spacing ($\Delta f$) of 15 kHz and are grouped into sets of 12 consecutive sub-carriers. 12 consecutive sub-carriers in one slot corresponds to one uplink resource block (RB). Therefore, a set of contiguous RBs can be allocated by signalling the number (O) of the starting RB and the number (P) of consecutive RBs. This is illustrated in FIG. 4, where O=1 and P=3.

In RAN#47bis it was agreed to limit the possible number of consecutive RBs that could be allocated (ie the values that P can take) to numbers that can be obtained as a product of the numbers 2, 3 and 5. In particular, the possible values that P can take are restricted to values obtained from:

$$P = 2^i \cdot 3^j \cdot 5^k$$

where i, j and k are integer values $\geq 0$; and P is less than or equal to the total number (N) of RBs available within the system bandwidth.

The table below shows the possible values P can have for a system bandwidth of 20 MHz. As shown, with the currently proposed frequency spacing between the sub-carriers and the number of sub-carriers per RB, this results in only 34 possible values for P, each of which is indexed in the table below with a unique index value (indexP).

| Index (indexP) | Contiguous RBs |
|---|---|
| 0 | 1 |
| 1 | 2 |
| 2 | 3 |
| 3 | 4 |
| 4 | 5 |
| 5 | 6 |
| 6 | 8 |
| 7 | 9 |
| 8 | 10 |
| 9 | 12 |
| 10 | 15 |
| 11 | 16 |
| 12 | 18 |
| 13 | 20 |
| 14 | 24 |
| 15 | 25 (5 MHz) |
| 16 | 27 |
| 17 | 30 |
| 18 | 32 |
| 19 | 36 |
| 20 | 40 |
| 21 | 45 |
| 22 | 48 |
| 23 | 50 (10 MHz) |
| 24 | 54 |
| 25 | 60 |
| 26 | 64 |
| 27 | 72 |
| 28 | 75 (15 MHz) |
| 29 | 80 |
| 30 | 81 |
| 31 | 90 |
| 32 | 96 |
| 33 | 100 (20 MHz) |

The present application describes three ways in which allocation data defining a set of contiguous RBs that have been allocated to a mobile telephone 3 can be signalled to the mobile telephone 3.

First Encoding Technique

The first encoding technique that the encoder module 35 can use to encode the above described resource allocation information is to use the values of O and indexP directly which are signalled to the mobile telephone 3. Thus for the allocation illustrated in FIG. 4, the encoder module 35 would use the value of P (in this case P=3) to address the above table to determine the value of the corresponding indexP (in this case indexP=2). The encoder module 35 would then output the values O=1 and indexP=2, which would then be signalled to the mobile telephone 3 by the resource allocation module 33.

To decode the signalled allocation data, the decoder module 91 within the mobile telephone 3 uses a stored copy of the above table and the signalled value of indexP to determine the corresponding number (P) of contiguous RBs that have been allocated to that mobile telephone 3. It then uses the signalled value of O and the thus determined value of P to work out its allocation for the current time point.

Second Encoding Technique

In the second encoding technique, the encoder module 35 generates an integer value (x) from the values of O and indexP as follows:

$$x = M * \text{indexP} + O$$

where M={25, 50, 75, 100} for system bandwidths={5, 10, 15, 20 MHz} respectively.

This integer value is then signalled to the mobile telephone 3 which uses its decoder module 91 to obtain the values of indexP and O as follows:

$$\text{indexP} = \text{floor}\left(\frac{x}{M}\right)$$

where "floor" is the well known floor function that provides the largest integer not greater than the value obtained from the calculation in brackets.

$$O = x - \text{indexP} * M = x - \text{floor}\left(\frac{x}{M}\right) \cdot M$$

The decoder module 91 then works out the mobile telephone's current resource allocation using the thus determined values of O and indexP in the same manner as in the first encoding technique.

Third Encoding Technique

In the third encoding technique, the encoder module 35 generates an integer value (x) from the values of O and indexP as follows:

$$x = L * O + \text{indexP}$$

where L={16, 24, 29, 34} for system bandwidths={5, 10, 15, 20 MHz} respectively.

This integer value is then signalled to the mobile telephone 3 which uses its decoder module 91 to obtain the values of indexP and O as follows:

$$O = \text{floor}\left(\frac{x}{L}\right)$$

$$\text{indexP} = x - O * L = x - \text{floor}\left(\frac{x}{L}\right) \cdot L$$

The decoder module 91 then works out the mobile telephone's current resource allocation using the thus determined values of O and indexP in the same manner as in the first encoding technique.

The number of bits required for signalling the resource allocation for systems having different bandwidths is illustrated in the table 1 below:

TABLE 1

| System Bandwidth (MHz) | Range of O | Range of indexP | Range of x for $2^{nd}$ encoding technique | Range of x for $3^{rd}$ encoding technique | Number of bits required Tech. 1 | Tech. 2 | Tech. 3 | Previous Tech. |
|---|---|---|---|---|---|---|---|---|
| 5 | 0-24 | 0-15 | 0-375 | 0-384 | 9 | 9 | 9 | 9 |
| 10 | 0-49 | 0-23 | 0-1150 | 0-1176 | 11 | 11 | 11 | 11 |
| 15 | 0-74 | 0-28 | 0-2100 | 0-2146 | 12 | 12 | 12 | 12 |
| 20 | 0-99 | 0-33 | 0-3300 | 0-3366 | 13 | 12 | 12 | 13 |

As can be seen from the above table, for a system bandwidth of 20 MHz, the $2^{nd}$ and $3^{rd}$ encoding techniques provide a one bit saving compared with the first technique and the previously proposed technique (see the applicant's earlier UK patent application GB 0605581.8).

SUMMARY

A number of efficient techniques have been proposed for resource block allocation signalling for the E-UTRA uplink transmission. The proposed techniques take into account the limitation of the scheduling assignment for the uplink which corresponds to DFT pre-coding sizes that can be written as a product of the numbers 2, 3 and 5 RBs. Based on the saving that is made with the $2^{nd}$ and $3^{rd}$ encoding techniques, these techniques are the currently preferred techniques that are used for resource allocation signalling.

Modifications and Alternatives

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, a mobile telephone based telecommunication system was described in which the above described signalling techniques were employed. As those skilled in the art will appreciate, the signalling of such resource allocation data can be employed in any communication system that uses a plurality of sub-carriers. In particular, the signalling techniques described above can be used in wire or wireless based communications either using electromagnetic signals or acoustic signals to carry the data. In the general case, the base station would be replaced by a communication node which communicates with a number of different user devices. User devices may include, for example, personal digital assistants, laptop computers, web browsers, etc.

In the above embodiments, the base station was assumed to have an operating bandwidth of 20 MHz and each resource block included 12 sub-carriers. As those skilled in the art will appreciate, the invention is not limited to this particular size of bandwidth or RB size or to the frequency spacing of the sub-carriers described.

In the second and third encoding techniques described above, a mapping was defined between the allocated RBs and a unique number which represented the combination of a starting RB and a number of continuous RBs in the allocation. As those skilled in the art will appreciate, this mapping may be defined in any appropriate way, such as using an equation or using a lookup table. The use of an equation is preferred as it removes the need to store a lookup table both in the base station 5 and in each of the mobile telephones 3. Although the equations described above are preferred due to their simplicity, other equations may be used to define this mapping.

In the above embodiments, the number of consecutive blocks allocated to a user device was mapped to an index value using the first look up table given above. As those skilled in the art will appreciate, this mapping may instead be defined by an equation.

In the above embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Introduction

The downlink L1/L2 control signalling is required to carry both downlink and uplink resource assignment information for each scheduled UE.

Since the number of bits available in the control channel is limited, efficient methods are needed to transmit the required information with the lowest number of bits without providing any restrictions on NodeB's scheduler for deciding resource assignment.

In this specification, we propose efficient methods for signaling the localised FDMA uplink resource block (RB) allocations.

METHOD 1: Signal O and indexP separately.

METHOD 2: Signal one integer value x derived as follows:

$$\text{Encoder: } x = N*\text{index}P + O$$

$$\text{Decoder: index}P = \text{floor}(x/N)$$

$$O = x - \text{index}P*N$$

where N={25, 50, 75, 100} for Bandwidths={5, 10, 15, 20 MHz}

METHOD 3: Signal one integer value x derived as follows:

$$\text{Encoder: } x = M*O + \text{index}P$$

$$\text{Decoder: } O = \text{floor}(x/M)$$

$$\text{index}P = x - O*M$$

where M={16, 24, 29, 34} for Bandwidths={5, 10, 15, 20 MHz}

METHOD 4: Signal one integer value x derived from 0 and P (not indexP) using the 'tree method' [2].

The number of bits required for each method is summarised in Table 3 below.

TABLE 3

Number of bits required for resource allocation signalling

| Bandwidth MHz | Range of O | Range of indexP | Range of x Method 2 | Range of x Method 3 | Method 1 | Method 2 | Method 3 | Method 4 |
|---|---|---|---|---|---|---|---|---|
| 5 | 0-24 | 0-15 | 0-375 | 0-384 | 9 | 9 | 9 | 9 |
| 10 | 0-49 | 0-23 | 0-1150 | 0-1176 | 11 | 11 | 11 | 11 |
| 15 | 0-74 | 0-28 | 0-2100 | 0-2146 | 12 | 12 | 12 | 12 |
| 20 | 0-99 | 0-33 | 0-3300 | 0-3366 | 13 | 12 | 12 | 13 |

Uplink DFT Precoding based Resource Allocations

In RAN1#47bis, it was agreed to limit the possible scheduling assignment for the uplink to DFT pre-coding sizes that can be written as a product of the numbers 2, 3, and 5 RBs. In that case, all possible contiguous resource allocations are not needed. Table 2 attached to the last page of the instant specification shows the possible resource allocations for 20 MHz. It is obvious that the number of possibilities is reduced, for 20 MHz only 34 possible allocations exist.

In order that eNB signals the resource allocation to the UE, it needs to find the number of contiguous RBs from Table 2 and also the starting position.

Let's define two parameters: indexP and O where indexP is the index corresponding to the selected number of contiguous RBs and O is the index of the starting resource block.

CONCLUSIONS

In this specification, we have proposed efficient methods for resource block allocation signalling for E-UTRA uplink transmission. The proposed methods take into account the limitation of the scheduling assignment for the uplink which corresponds to DFT pre-coding sizes that can be written as a product of the numbers 2, 3, and 5 RBs. Based on this, Method2 or 3 provides a small number of bits for resource allocation signalling in the uplink for EUTRA.

Hence, we propose:

Method2 or 3 should be used for signaling the localised resource block allocations for E-UTRA uplink transmissions.

INDUSTRIAL APPLICABILITY

The present invention is applicable not only to a mobile telephone based telecommunication system but also to a communication system which uses OFDMA and sub-carriers.

This application is based upon and claims the benefit of priority from United Kingdom patent application No. 0715057.6, filed on Aug. 2, 2007, the disclosure of which is incorporated herein in its entirety by reference.

TABLE 2

Possible contiguous resource allocation for different bandwidths.

| Index (indexP) | Contiguous RBs |
|---|---|
| 0 | 1 |
| 1 | 2 |
| 2 | 3 |
| 3 | 4 |
| 4 | 5 |
| 5 | 6 |
| 6 | 8 |
| 7 | 9 |
| 8 | 10 |
| 9 | 12 |
| 10 | 15 |
| 11 | 16 |
| 12 | 18 |
| 13 | 20 |
| 14 | 24 |
| 15 | 25 (5 MHZ) |
| 16 | 27 |
| 17 | 30 |
| 18 | 32 |
| 19 | 36 |
| 20 | 40 |
| 21 | 45 |
| 22 | 48 |
| 23 | 50 (10 MHz) |
| 24 | 54 |
| 25 | 60 |
| 26 | 64 |
| 27 | 72 |
| 28 | 75 (15 MHz) |
| 29 | 80 |
| 30 | 81 |
| 31 | 90 |
| 32 | 96 |
| 33 | 100 (20 MHz) |

The invention claimed is:

1. A method of signalling resource allocation data in a communication system which uses a plurality of sub-carriers arranged in a sequence of blocks, the method comprising:
   receiving an allocation of said sub-carriers for a user device, the allocation comprising data defining a starting block and data defining a number of consecutive blocks from the starting block;
   a first mapping of mapping the data defining the number of consecutive blocks from the starting block to a first mapped value in accordance with first mapping data;
   a second mapping of mapping the data defining the starting block and said first mapped value to a second mapped value representative of the allocation in accordance with second mapping data; and
   signalling said second mapped value as resource allocation data to the user device,
   wherein said first mapping data defines a mapping such that said first mapped value is less than or equal to the number of consecutive blocks allocated to the user device, and
   wherein said first mapping further defines a one-to-one mapping between said allocated number of consecutive blocks and said first mapped value.

2. The method according to claim 1, wherein a number of possible consecutive blocks that can be allocated is chosen from a subset of all possible numbers of consecutive blocks that can be allocated.

3. The method according to claim 1, wherein said first mapping data defines a lookup table, and
   wherein said first mapping uses the data defining the number of consecutive blocks to address the look up table to determine said first mapped value.

4. The method according to claim 1, wherein said second mapping data defines one or more equations.

5. The method according to claim 1, wherein said second mapping data defines a look up table that is addressed by a combination of the data defining the starting block and the first mapped value.

6. The method according to claim 1, wherein said signalling signals said second mapped value in a signalling channel common to said user devices.

7. The method according to claim 1, wherein a number of possible consecutive blocks that are allocated is chosen from a subset defined by:

$$P = 2^i \cdot 3^j \cdot 5^k$$

where i, j, and k are integer values $\geq 0$, and P is less than or equal to a total number of blocks in said sequence of blocks.

8. The method according to claim 1, wherein said second mapping data defines the following expression:

$$x = M^* \text{index} P + O$$

where x is the second mapped value, M is a system constant which depends upon a system, bandwidth, a number of sub-carriers within each block, and a frequency spacing between adjacent sub-carriers, indexP is the first mapped value, and O is a number of the starting block.

9. The method according to claim 1, wherein said second mapping data defines the following expression:

$$x = L^* O + \text{index} P$$

where x is the second mapped value, L is a system constant which depends upon a system bandwidth, a number of sub-carriers within each block, and a frequency spacing between adjacent sub-carriers, indexP is the first mapped value, and O is a number of the starting block.

10. The method according to claim 2, wherein the number of possible consecutive blocks that can be allocated is chosen from, the subset defined by:

$$P = 2^i \cdot 3^j \cdot 5^k$$

where i, j, and k are integer values $\geq 0$, and P is less than or equal to a total number, N, of blocks in said sequence of blocks.

11. The method according to claim 4, wherein said second mapping data defines the following expression:

$$x = M^* \text{index} P + O$$

where x is the second mapped value, M is a system constant which depends upon a system bandwidth, a number of sub-carriers within each block, and a frequency spacing between adjacent sub-carriers, indexP is the first mapped value, and O is a number of the starting block.

12. The method according to claim 4, wherein said second mapping data defines the following expression:

$$x = L^* O + \text{index} P$$

where x is the second mapped value, L is a system constant which depends upon a system, bandwidth, a number of sub-carriers within each block, and a frequency spacing between adjacent sub-carriers, indexP is the first mapped value, and O is a number of the starting block.

13. The method according to claim 11, where M is equal to 25 for a 5 MHz system, bandwidth, 50 for a 10 MHz system bandwidth, 75 for a 15 MHz, system bandwidth, and 100 for a 20 MHz system bandwidth.

14. The method according to claim 12, where L is equal to 16 for a 5 MHz system bandwidth, 24 for a 10 MHz system bandwidth, 29 for a 15 MHz system bandwidth, and 34 for a 20 MHz system bandwidth.

15. A method of determining resource allocation in a communication system which uses a plurality of sub-carriers arranged, in a sequence of blocks, the method comprising:
receiving resource allocation data encoding a starting block and a number of consecutive blocks from, the starting block;
a first mapping of mapping the received allocation, data to the starting block within said sequence using first mapping data;
a second mapping of mapping the received allocation data to a value encoding the number of consecutive blocks from the starting block using second mapping data;
a third mapping of mapping said value encoding the number of consecutive blocks to the number of consecutive blocks from the starting block using third mapping data; and
determining the allocated sub-carriers using the starting block and the number of consecutive blocks from the starting block,
wherein said third mapping data defines a mapping such that said number of consecutive blocks is greater than the value encoding the number of consecutive blocks, and
wherein said third mapping defines a one-to-one mapping between the allocated number of consecutive blocks and said value encoding the number of consecutive blocks.

16. The method according to claim 15, wherein a number of possible consecutive blocks that can be allocated is one of a subset of all possible numbers of consecutive blocks that can be allocated.

17. The method according to claim 15, wherein said third mapping data defines a lookup table, and
wherein said third mapping uses the value encoding the number of consecutive blocks to address the look up table.

18. The method according to claim 15, wherein said first mapping data defines one or more equations.

19. The method according to claim 15, wherein at least one of said first and second mapping data defines a look up table.

20. The method according to claim 15, wherein said receiving receives said allocation data in a signalling channel that is common to the communication system.

21. The method according to claim 16, wherein the number of possible consecutive blocks that can be allocated is chosen from the subset defined by:

$$P = 2^i \cdot 3^j \cdot 5^k$$

where i, j, and k are integer values $\geq 0$, and P is less than or equal to a total number, N, of blocks in said sequence of blocks.

22. The method according to claim 18, wherein said first mapping determines the starting block, O, from the received allocation data from the following equation:

$$O = x - \text{floor}\left(\frac{x}{M}\right) \cdot M$$

where x is the received resource allocation data, M is a system constant that depends on the system bandwidth, a number of sub-carriers within each block, and a frequency spacing between adjacent sub-carriers, and floor ( ) is the floor function.

23. The method according to claim 18, wherein said second mapping data defines one or more equations.

24. The method according to claim 18, wherein said first mapping determines the starting block, O, from the received allocation data from the following equation:

$$O = \text{floor}\left(\frac{x}{L}\right)$$

where x is the received resource allocation data, L is a system constant that depends on a system bandwidth, a number of sub-carriers within each block, and a frequency spacing between adjacent sub-carriers; and floor ( ) is the floor function.

25. The method according to claim 18, wherein said second mapping data defines one or more equations.

26. The method according to claim 23, wherein said second mapping determines the value, indexP, encoding the number of consecutive blocks from the received allocation data from the following equation:

$$indexP = \text{floor}\left(\frac{x}{M}\right)$$

where x is the received resource allocation data, M is a system constant that depends on a system bandwidth, a number of sub-carriers within each block and a frequency spacing between adjacent sub-carriers, and floor ( ) is the floor function.

27. The method according to claim 25, wherein said second mapping determines the value, indexP, encoding the number of consecutive blocks from the received allocation data from the following equation:

$$indexP = x - \text{floor}\left(\frac{x}{L}\right) \cdot L$$

where x is the received resource allocation data, L is a system constant that depends on a system bandwidth, a number of sub-carriers within each block, and a frequency spacing between adjacent sub-carriers, and floor ( ) is the floor function.

28. A communication node for signalling resource allocation data in a communication system which uses a plurality of sub-carriers arranged in a sequence of blocks, the communication node comprising:
means for receiving an allocation of said sub-carriers for a user device, the allocation comprising data defining a starting block and data defining a number of consecutive blocks from the starting block;

means for performing a mapping of the data defining the number of consecutive blocks from the starting block to a first mapped value in accordance with first mapping data;
means for performing a mapping of the data defining the starting block and said first mapped value to a second mapped value representative of the allocation in accordance with second mapping data; and
means for signalling said second, mapped value as resource allocation data to the user device,
wherein said first mapping data defines a mapping such that said first mapped value is less than or equal to the number of consecutive blocks allocated to the user device, and
wherein said first mapping data further defines a one-to-one mapping between said allocated number of consecutive blocks and said first mapped value.

29. A communication node for signalling resource allocation data in a communication system which uses a plurality of sub-carriers arranged in a sequence of blocks, the communication node comprising a resource allocation module operable to:
receive an allocation of said sub-carriers for a user device, the allocation comprising data defining a starting block and data defining a number of consecutive blocks from the starting block;
perform a mapping of the data defining the number of consecutive blocks from the starting block to a first mapped value in accordance with first mapping data;
perform a mapping of the data defining the starting block and said first mapped value to a second mapped value representative of the allocation in accordance with second mapping data; and
signal said second mapped value as resource allocation data to the user device,
wherein said first mapping data defines a mapping such that said first mapped value is less than or equal to the number of consecutive blocks allocated to the user device, and
wherein said first mapping data further defines a one-to-one mapping between said allocated number of consecutive blocks and said first mapped value.

30. A user device operable to determine resource allocation, for use in communicating within a communication system which uses a plurality of sub-carriers arranged in a sequence of blocks, the user device comprising:
means for receiving resource allocation, data encoding a starting block and a number of consecutive blocks from the starting block;
means for mapping the received allocation data to the starting block within said sequence using first mapping data;
means for mapping the received allocation data to a value encoding the number of consecutive blocks from the starting block using second mapping data;
means for mapping said value encoding the number of consecutive blocks to the number of consecutive blocks from the starting block using third mapping data; and
means for determining the allocated sub-carriers using the starting block and the number of consecutive blocks from the starting block,
wherein said third mapping data defines a mapping such that said number of consecutive blocks is greater than the value encoding the number of consecutive blocks, and
wherein said third mapping defines a one-to-one mapping between the allocated number of consecutive blocks and said value encoding the number consecutive blocks.

31. A user device operable to determine resource allocation for use in communicating within a communication system which uses a plurality of sub-carriers arranged in a sequence of blocks, the user device comprising a communications module, operable to:
receive resource allocation data encoding a starting block and a number of consecutive blocks from the starting block;
perform a mapping of the received allocation data to the starting block within said sequence using first mapping data;
perform a mapping of the received allocation data to a value encoding the number of consecutive blocks from the starting block using second mapping data;
perform a mapping of said value encoding the number of consecutive blocks to the number of consecutive blocks from the starting block using third mapping data; and
determine the allocated sub-carriers using the starting block and the number of consecutive blocks from the starting block,
wherein said third mapping data defines a mapping such that said number of consecutive blocks is a eater than the value encoding the number of consecutive blocks, and
wherein said third mapping defines a one-to-one mapping between the allocated number of consecutive blocks and said value encoding the number of consecutive blocks.

32. A method of signalling resource allocation data in a communication system which uses a plurality of sub-carriers arranged in a sequence of blocks, the method comprising:
receiving an allocation of said sub-carriers for a user device, the allocation comprising data defining a starting block and data defining a number of consecutive blocks from the starting block;
mapping the data defining the number of consecutive blocks from the starting block to a mapped value in accordance with predefined mapping data; and
signalling resource allocation data to the user device in dependence upon said data defining said starting block and said mapped value,
wherein said first mapping data defines a mapping such that said first mapped value is less than or equal to the number of consecutive blocks allocated to the user device, and
wherein said first mapping data further defines a one-to-one mapping between said allocated number of consecutive blocks and said first mapped value.

33. A method of determining resource allocation in a communication system which uses a plurality of sub-carriers arranged in a sequence of blocks, the method comprising:
receiving resource allocation data defining a starting block and a value related, to a number of consecutive blocks from the starting block, through a predefined mapping;
mapping the value to said number of consecutive blocks to a mapped value using predefined mapping data; and
determining the allocated sub-carriers using the starting block and said number of consecutive blocks,
wherein said mapping data defines a mapping such that said mapped value is less than or equal to the value related to the number of consecutive blocks, and
wherein said mapping, data further defines a one-to-one mapping between the value related to number of consecutive blocks and said mapped value.

* * * * *